(12) United States Patent
Lim et al.

(10) Patent No.: US 12,396,533 B2
(45) Date of Patent: Aug. 26, 2025

(54) TRANSPORTATION OF BICYCLES

(71) Applicant: DLIP LIMITED, Hamilton (NZ)

(72) Inventors: David Tien Ang Lim, Hamilton (NZ); Russell William Page-Wood, Hamilton (NZ); Lincoln Henry Tutton Hill, Hamilton (NZ)

(73) Assignee: DLIP LIMITED, Hamilton (NZ)

( * ) Notice: Subject to any disclaimer, the term of this patent is extended or adjusted under 35 U.S.C. 154(b) by 40 days.

(21) Appl. No.: 18/248,006

(22) PCT Filed: Oct. 8, 2021

(86) PCT No.: PCT/NZ2021/050170
§ 371 (c)(1),
(2) Date: Apr. 5, 2023

(87) PCT Pub. No.: WO2022/075863
PCT Pub. Date: Apr. 14, 2022

(65) Prior Publication Data
US 2023/0371667 A1 Nov. 23, 2023

(51) Int. Cl.
*B65D 85/68* (2006.01)
*A45C 5/14* (2006.01)
(Continued)

(52) U.S. Cl.
CPC ............... *A45C 9/00* (2013.01); *A45C 5/14* (2013.01); *A45C 13/02* (2013.01); *B25H 1/0014* (2013.01);
(Continued)

(58) Field of Classification Search
CPC ... B25H 3/00; B25H 3/10; B25H 3/02; B65D 85/68; B65D 2585/6862; A45C 9/00; A45C 5/14; A45C 13/02
(Continued)

(56) References Cited

U.S. PATENT DOCUMENTS 10,329,083 B1 * 6/2019 Chuang .................... B62J 19/00
2010/0230311 A1 * 9/2010 Jacques .................. A45C 13/02
206/335
(Continued)

FOREIGN PATENT DOCUMENTS

DE 29907223 U1 11/1999
DE 10019542 A1 11/2000
(Continued)

OTHER PUBLICATIONS

International Search Report and Written Opinion received for PCT/NZ2021/050170, mailed Dec. 1, 2021.
(Continued)

*Primary Examiner* — Steven A. Reynolds
(74) *Attorney, Agent, or Firm* — Greer, Burns & Crain, Ltd

(57) ABSTRACT

A protective case for a bicycle, which is an enclosed hollow rectangular cuboid including a top half; a lower half; wherein the top and lower halves releasably connect together to form the enclosed cuboid; and wherein each of the halves has: rigid outer wall sections for each surface of the cuboid so that the cuboid is fully enclosed; wherein at least the lower half has a stand attached thereto and the stand being adapted to connect to a bicycle frame of the bicycle and the case being adapted to support the bicycle when the stand is in, either: a non-extended position; and an extended position; wherein the stand is releasably attached to a mounting system; and the mounting system can hold the bicycle either in alignment or orthogonally to the longitudinal axis of the lower half.

16 Claims, 14 Drawing Sheets

(51) Int. Cl.
*A45C 9/00* (2006.01)
*A45C 13/02* (2006.01)
*B25H 1/00* (2006.01)
*B62H 3/00* (2006.01)

(52) U.S. Cl.
CPC ............... *B62H 3/00* (2013.01); *B65D 85/68* (2013.01); *B65D 2585/6862* (2013.01)

(58) Field of Classification Search
USPC ........................................................ 206/335
See application file for complete search history.

(56) References Cited

U.S. PATENT DOCUMENTS

| | | | | |
|---|---|---|---|---|
| 2015/0231780 | A1* | 8/2015 | Hirokawa | B25H 1/0014 248/670 |
| 2015/0266664 | A1* | 9/2015 | Noer | A45C 13/02 206/216 |
| 2016/0159561 | A1* | 6/2016 | Pelegrin | A45C 13/02 206/335 |
| 2018/0044103 | A1* | 2/2018 | Gustavsson | A45C 13/103 |
| 2018/0370588 | A1* | 12/2018 | Chuang | B62H 3/10 |
| 2020/0260827 | A1* | 8/2020 | Lim | B25H 3/02 |
| 2021/0000234 | A1* | 1/2021 | Kax | B62J 19/00 |

FOREIGN PATENT DOCUMENTS

| | | |
|---|---|---|
| NZ | 746362 A | 2/2020 |
| WO | 2014086907 A1 | 6/2014 |
| WO | 2019059781 A1 | 3/2019 |

OTHER PUBLICATIONS

International Preliminary Report on Patentability received for PCT/NZ2021/050170, mailed Aug. 29, 2022.
Thule Sweden, "Thule RoundTrip Transition," retrieved from Internet, URL: https://www.youtube.com/watch?v=zk-NIBjSyWM, published on Jun. 25, 2015, screenshot provided, 1 page.
Road.cc, "Feedback Sports Sprint Workstand," review by Mike Stead, retrieved from Internet, URL: https://road.cc/content/review/154719-feedback-sports-sprint-workstand, published on Dec. 6, 2017, 22 pages.
Outside Magazine, "Park Tool PRS-22.2 Team Issue Repair Stand," review by Dave Rome, retrieved from Internet, URL: https://www.cyclingtips.com/2018/07/park-tool-prs-22-team-issue-repair-stand-review/, CYCLINGTIPS, Jul. 18, 2018, 14 pages.

* cited by examiner

TRANSPORTATION OF BICYCLES

BACKGROUND

The present invention relates to improvements in and relating to transportation. In particular, the transportation of bicycles.

BACKGROUND ART

The transportation of bicycles—which can be very expensive when one looks at high end road bikes and mountain bikes—often requires a transportation and storage solution which protects the bike whilst in transit.

Protective cases for bicycles—typically known as bicycle carry boxes—are useful for cyclists who wish to transport their bike long distances—via carriers, airlines or their own car—and want their bike to be encapsulated and fully protected during the journey.

It would be useful if a bicycle carry box could provide additional functions over and above their ability to transport and protect a bike whilst at the same time not compromising this function.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements, integers or steps, but not the exclusion of any other element, integer or step, or group of elements, integers or steps.

Further aspects and advantages of the present invention will become apparent from the ensuing description which is given by way of example only.

Definitions

The term 'wall' as used herein refers to a surface which surrounds or separates an area and can protect the area surrounded from outside intrusion.

SUMMARY

According to one aspect of the present invention there is provided a protective case for a bicycle which has a top case part and a lower case part, each case part having one or more wall sections substantially defining an interior area on the inner surface of said wall(s); wherein when said top and lower case parts are releasably connected to one another they form an at least substantially enclosed space; and wherein the lower case part of the protective case includes a stand attached thereto, said stand adapted to connect to a bicycle frame of the bicycle, said stand extendable from a non-extended position to an extended position without being detached from the lower case part, and:

with the top and lower case parts connected to one another and with the stand attached to the lower case part in the non-extended position, the case is configured for storage and transportation of the bicycle with wheels of the bicycle removed from the bicycle frame; and with the top case part removed from the top of the lower case part and with the stand attached to the lower case part in the extended position the stand extends from the lower case part to support the fully assembled bicycle outside of the lower case part, the case is configured as a freestanding mobile workshop for working on the fully assembled bicycle; and wherein the stand includes a releasably attachable mounting system for holding a bicycle, said mounting system being configured to be movable between at least two positions:

a first position wherein the mounting system holds the bicycle in alignment or parallel to the longitudinal axis of the lower case part; and a second position wherein the mounting system holds the bicycle orthogonally with respect to the longitudinal axis of the lower case part.

Preferably when the top case part is removed from the lower case part, the top case part may be placed in alignment with respect to the transverse axis of the lower case part and connected to one end of the lower case part. In this 'workshop mode' the top case part and the lower case part form a T-shape, thereby providing stability to the 'workshop mode' configuration of the protective case. This 'workshop mode' also enables greater access to either side of the bike to be worked on.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1:
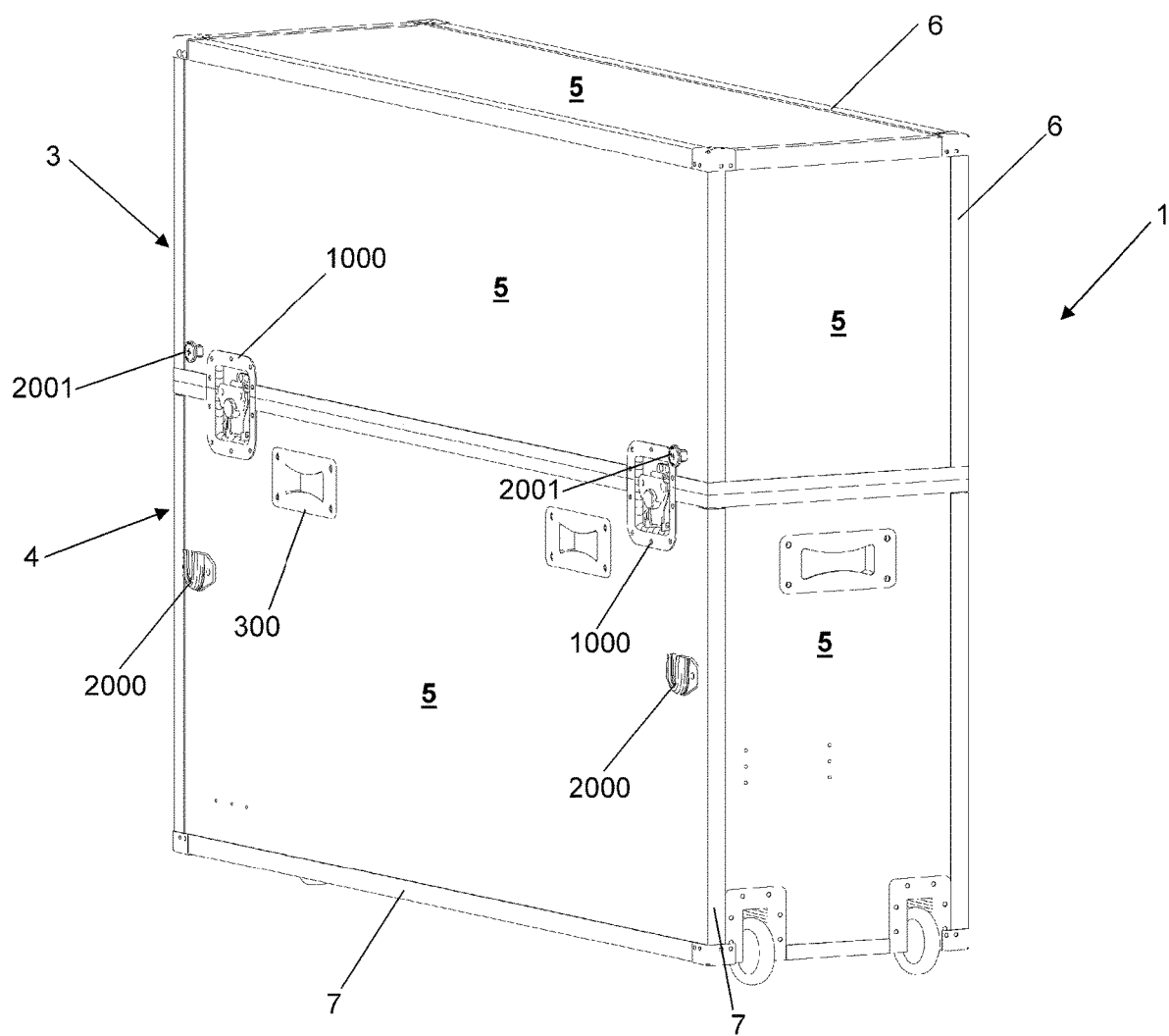
FIG. 1 shows a perspective view of a protective case, in a closed 'transport' configuration, in accordance with one preferred embodiment of the present invention.

With respect to FIG. 1 there is provided a protective case 1 for a bicycle 2. The protective case has a top half or top case part 3 and a lower half or lower case part 4 which are connected on top of one another by a plurality of latches 1000.

Example One—See FIG. 1

The top and lower halves 3, 4 have rigid outer walls 5 made from composite sheets formed from a honey comb aluminium core sandwiched between two sheets of carbon fibre. The composite sheets are riveted to a frame having frame members 6 on the top half and a frame having frame members 7 on the lower half. The frame members 6,7 being in the form of aluminium extrusions. The lower half 4 has handles 300 thereon to assist with lifting and holding the protective case 1. This configuration of the present invention makes for an aesthetically pleasing and high end protective case. The lower half 4 has a telescopic stand 8 attached to:

the base of the lower half 4; and the upper portion of the inside of said rigid walls 5 via a flanged u-shape brace 21.

The protective case 1 has a mounting system 9 removably attached to the telescopic stand 8.

When the top and lower halves 3, 4 are connected together on top of one another the handles of the bicycle are removed for storage therein and transportation. The wheels of the bicycle are also removed for storage and transportation.

Figure 2:
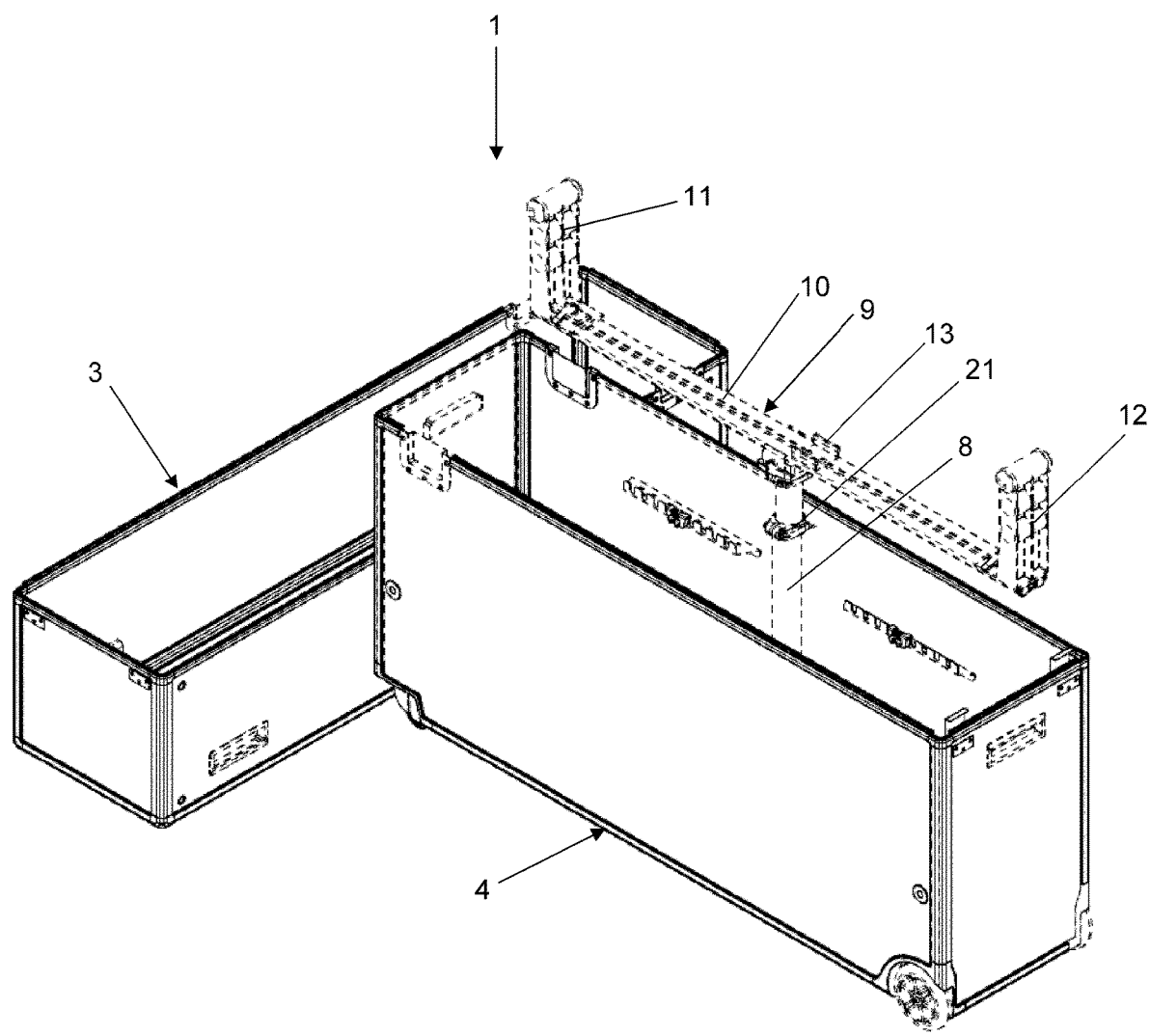
FIG. 2 shows the protective case in FIG. 1 transitioning into an open 'workshop mode' configuration, wherein the mounting system is attached to the telescopic stand and is in alignment or parallel to the longitudinal axis of the lower case part.
Figure 3:
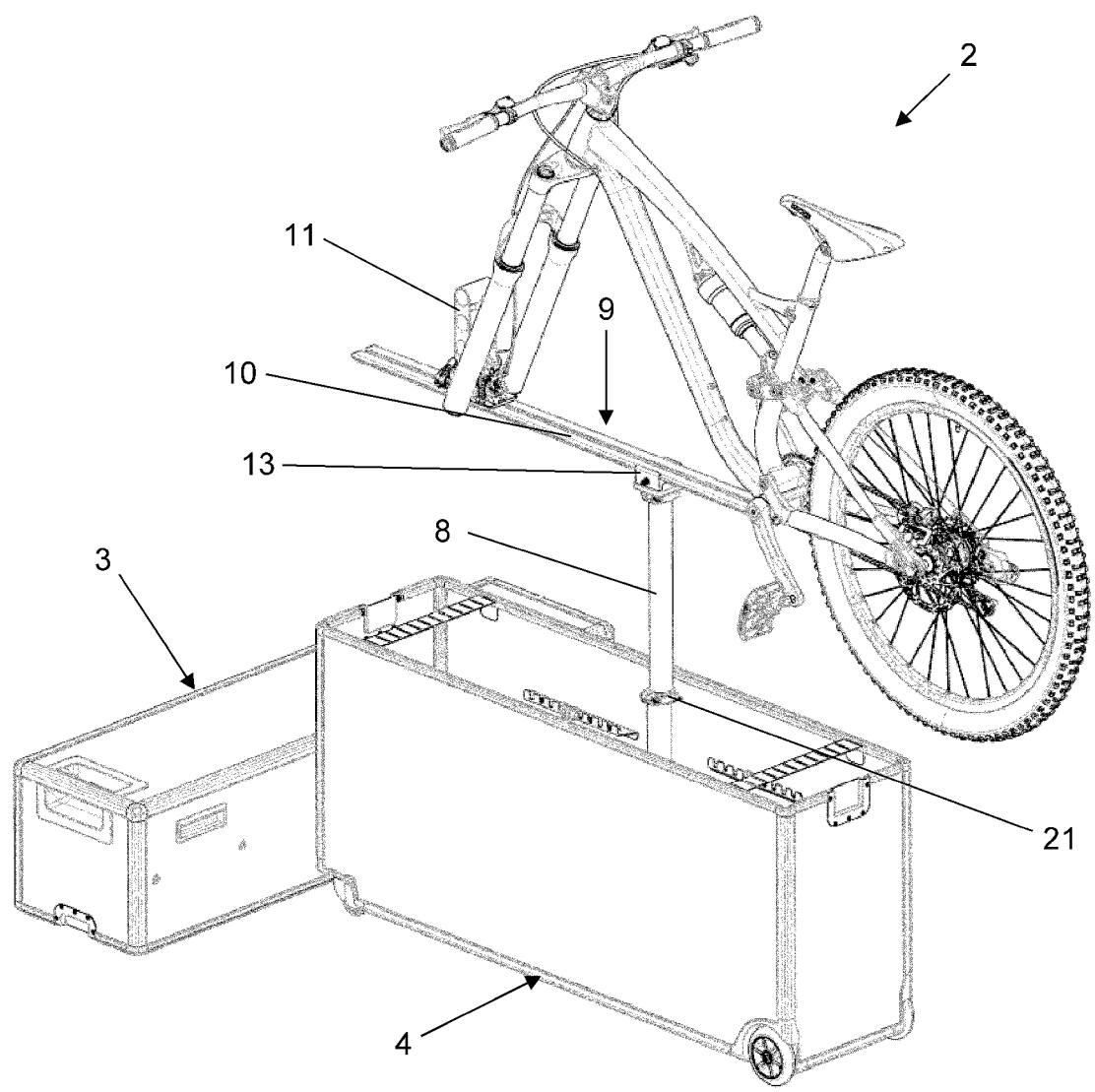
FIG. 3 shows the protective case in FIG. 2 in an open 'workshop mode' configuration, wherein the telescopic stand is extended, and the mounting system holds the bicycle in alignment or parallel to the longitudinal axis of the lower case part.
Figure 4:
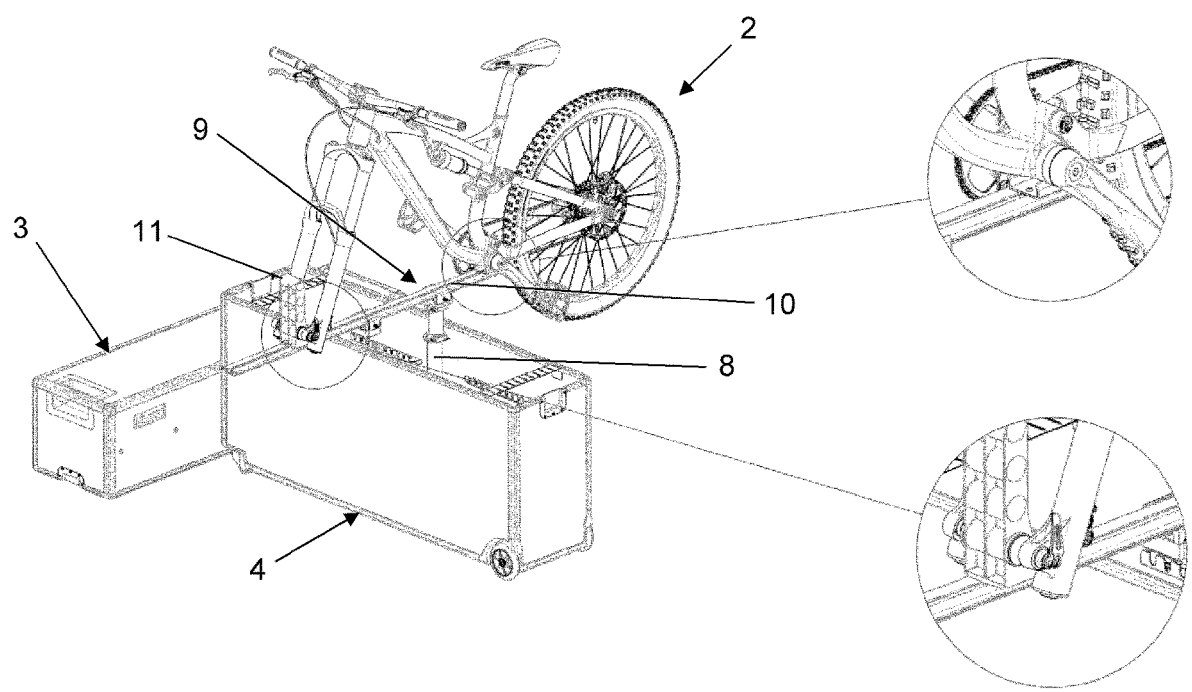
FIG. 4 shows an alternate 'workshop mode' configuration of the protective case in FIG. 3, wherein the mounting system holds the bicycle orthogonally with respect to the longitudinal axis of the lower case part.
Figure 7:
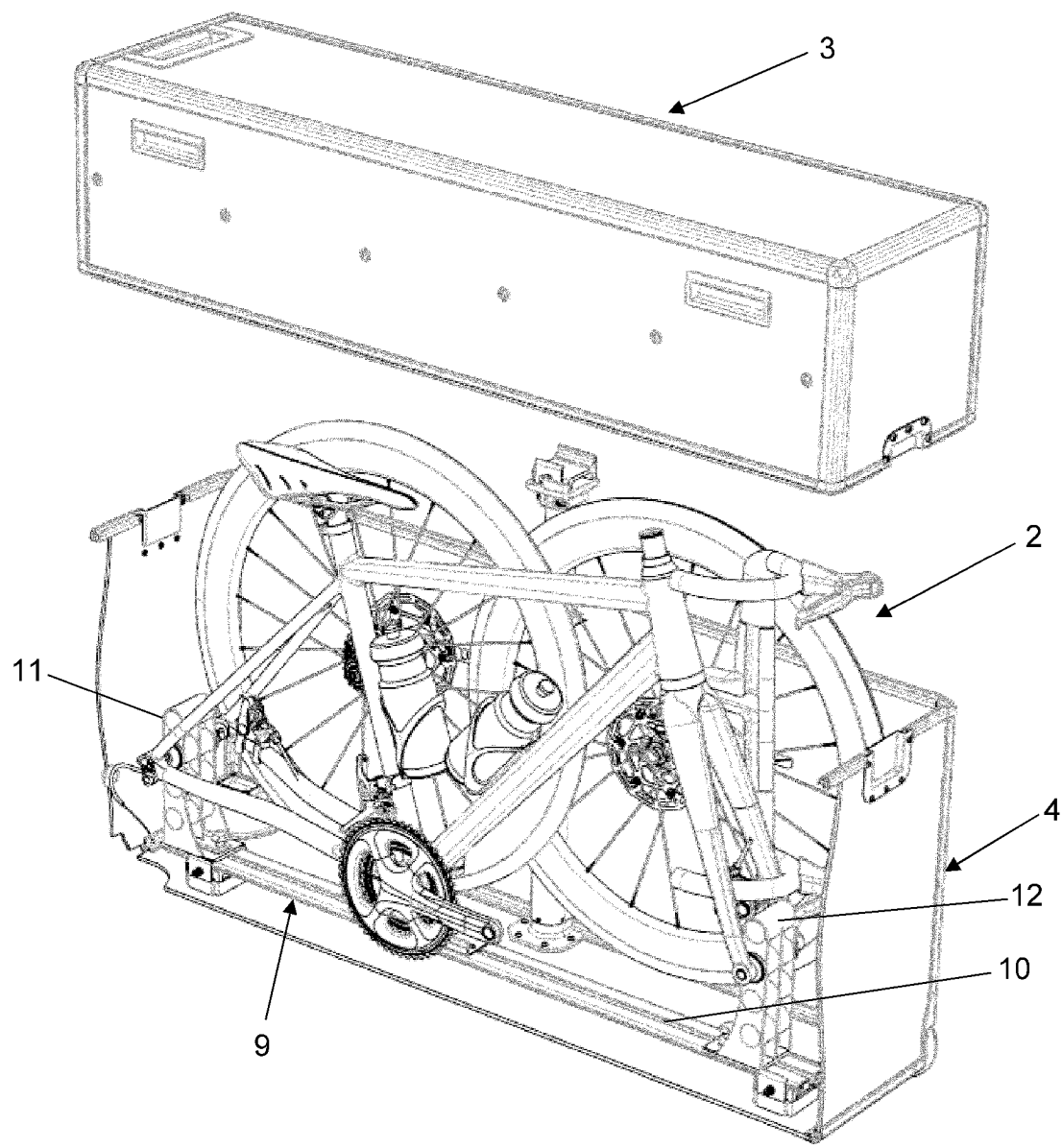
FIG. 7 shows a cut-away view of FIG. 6, with the partially disassembled bicycle on the rail of the mounting system, which is detached from the telescopic stand.
Figure 8:
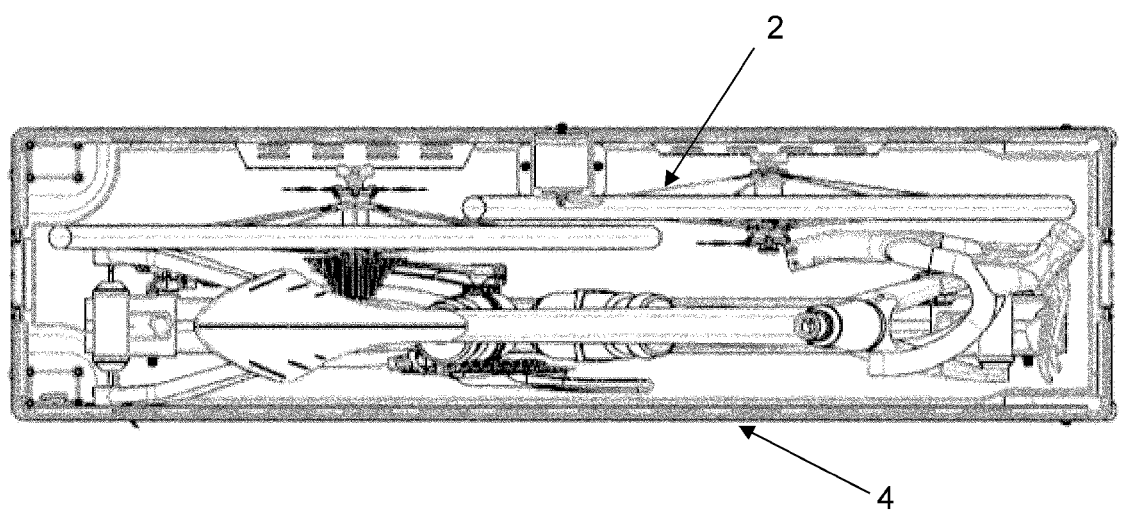
FIG. 8 shows a top plan view of FIG. 6, with the partially disassembled bicycle stowed in the lower case part.
Figure 9:
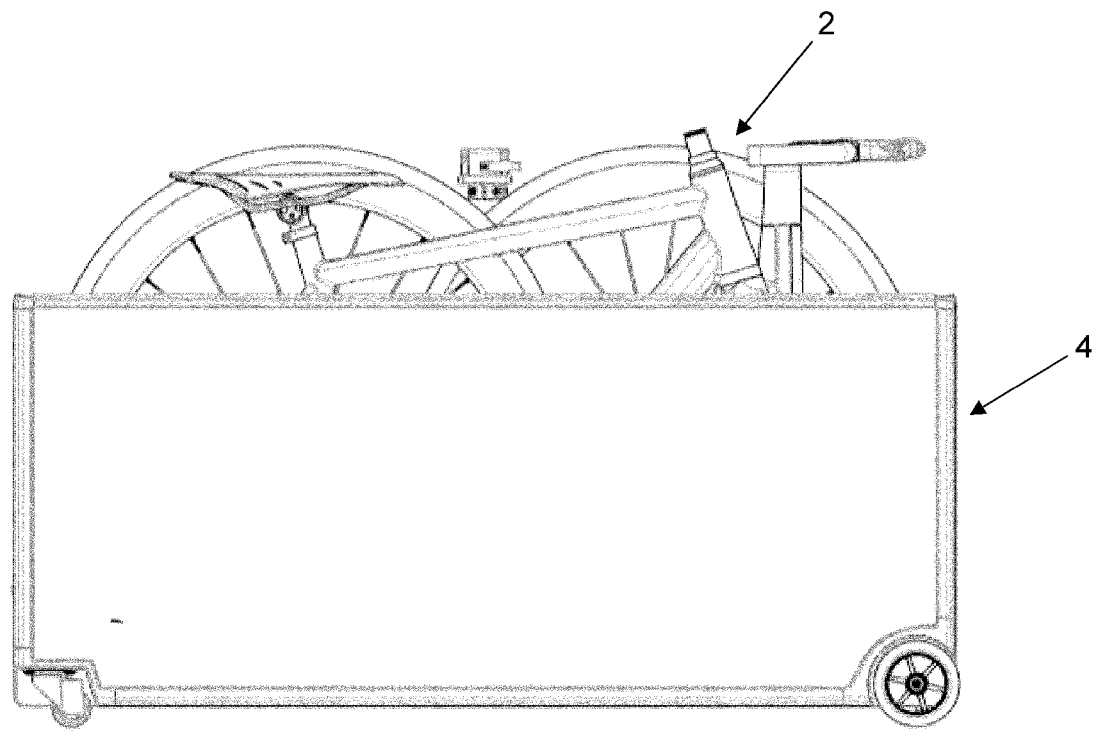
FIG. 9 shows a side view of FIG. 6.

When the mounting system 9 is attached to the telescopic stand 8—see FIGS. 2, 3 and 4—this transforms the protective case 1 into a free standing mobile workshop for working on the bike 2. Conversely, when the mounting system 9 is removed from the telescopic stand 8—see FIGS. 5 and 7—the mounting system becomes a mount for holding the bike 2 securely in place within the protective case 1 whilst the bike 2 is in transit. Thus the bike may be mounted to the mounting system in both the storage and transportation configuration and the freestanding mobile workshop configuration.

Figure 5:
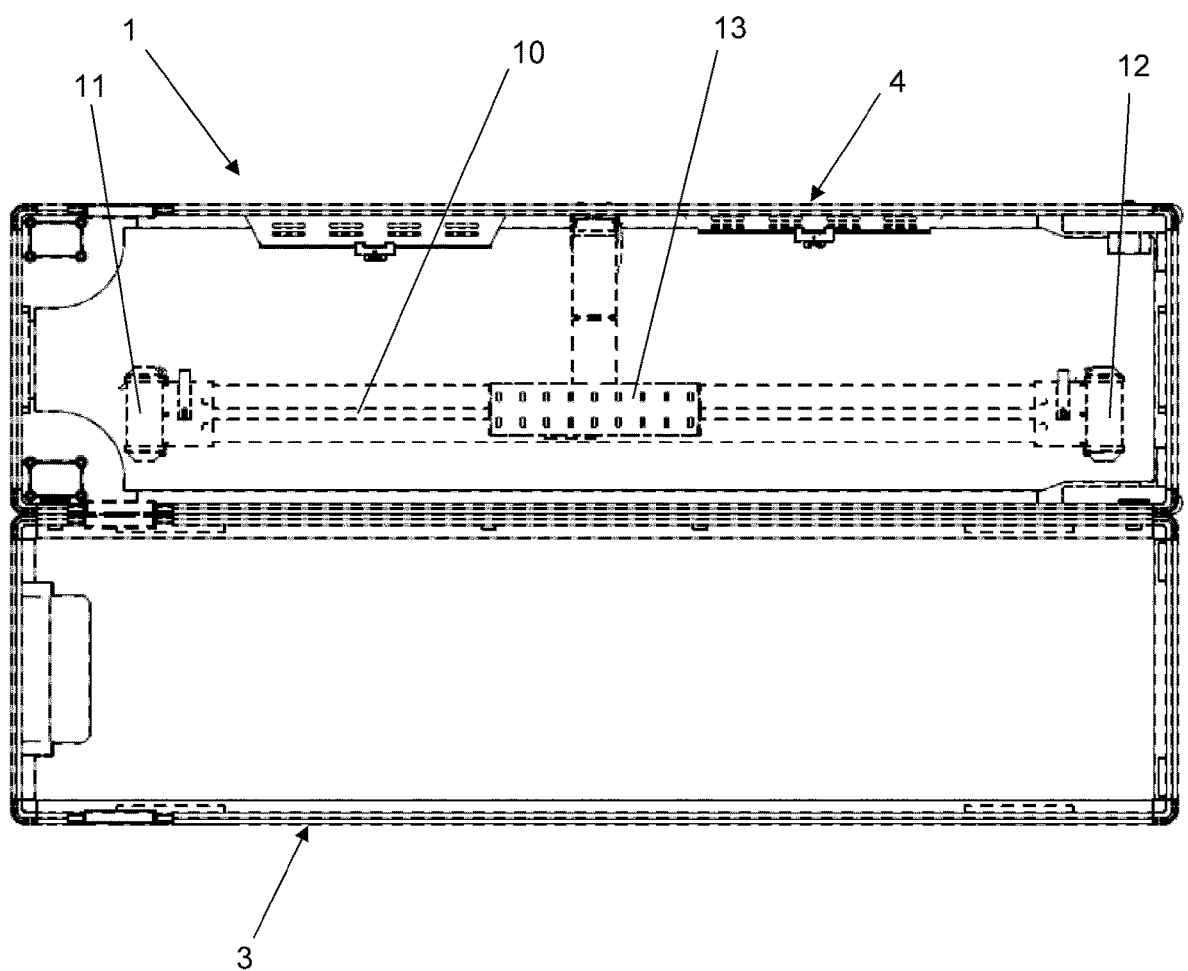
FIG. 5 shows the protective case of FIGS. 1-4, transitioning from an open 'workshop mode' configuration to a closed 'transport' configuration, wherein the mounting system is detached and removed from the telescopic stand.
Figure 6:
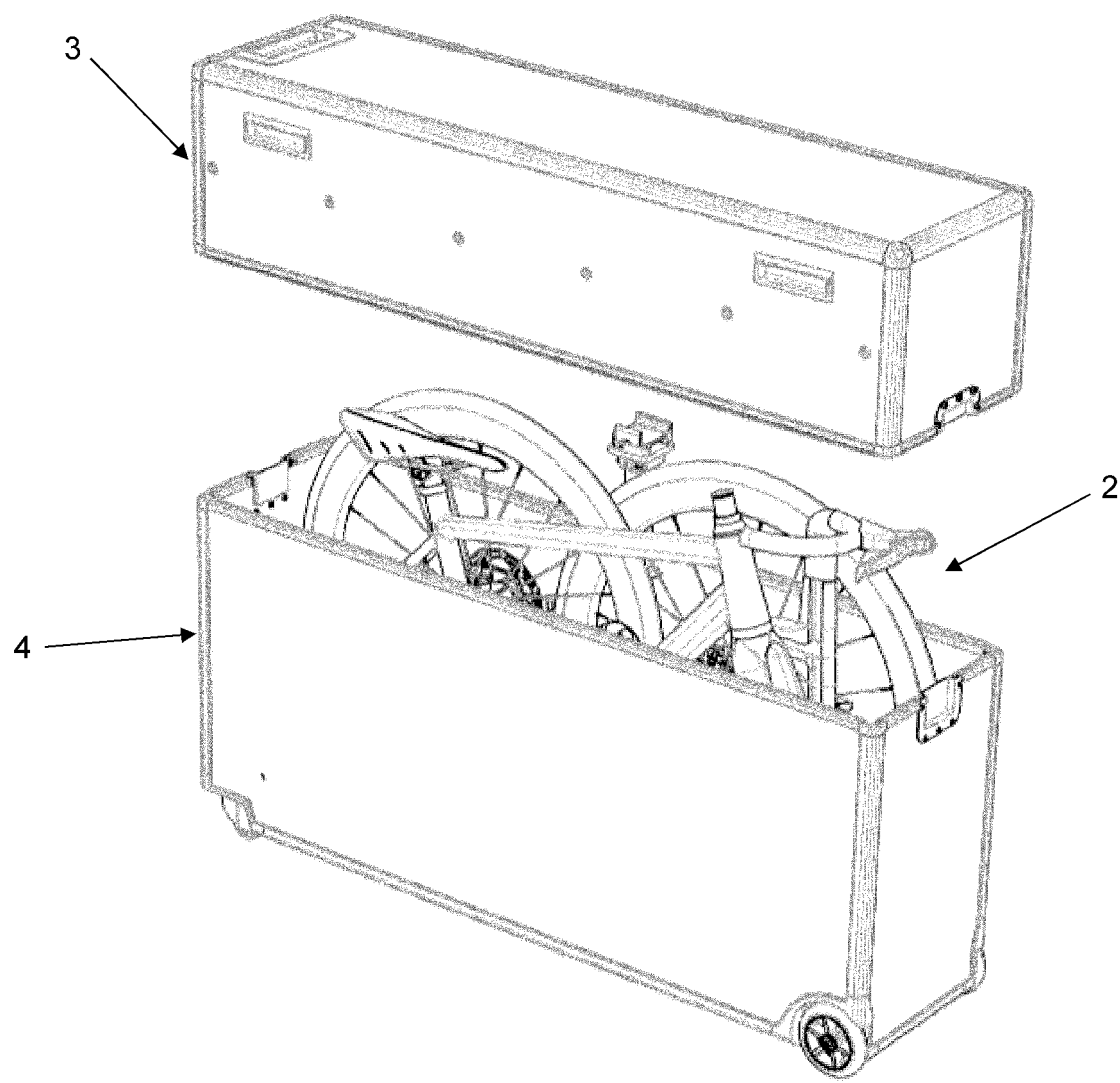
FIG. 6 shows the protective case in FIG. 5, wherein the bicycle is disassembled and stowed in the lower case part.

The top half 3 and lower half 4 connect to one another when in the freestanding mobile workshop configuration so as to be side by side via open ended channels 2000 which are located on the lower half and into which a pair bulbous protrusions 2001 on the top half are placed so as to sliding engage with one another to effect a connection, as shown in FIG. 5.

In an alternative configuration, when in the freestanding mobile workshop configuration, the top case part and lower case part are configured for the top case part to be connected to one end of the lower case part and orthogonal to the lower case part so that the top and lower case parts form a T-shape to provide a stable base for supporting the bicycle on the stand, as shown in FIGS. 2 to 4. This T-shaped arrangement may use the same open ended channel and bulbous protrusions as described above and shown in FIG. 1.

Figure 10:
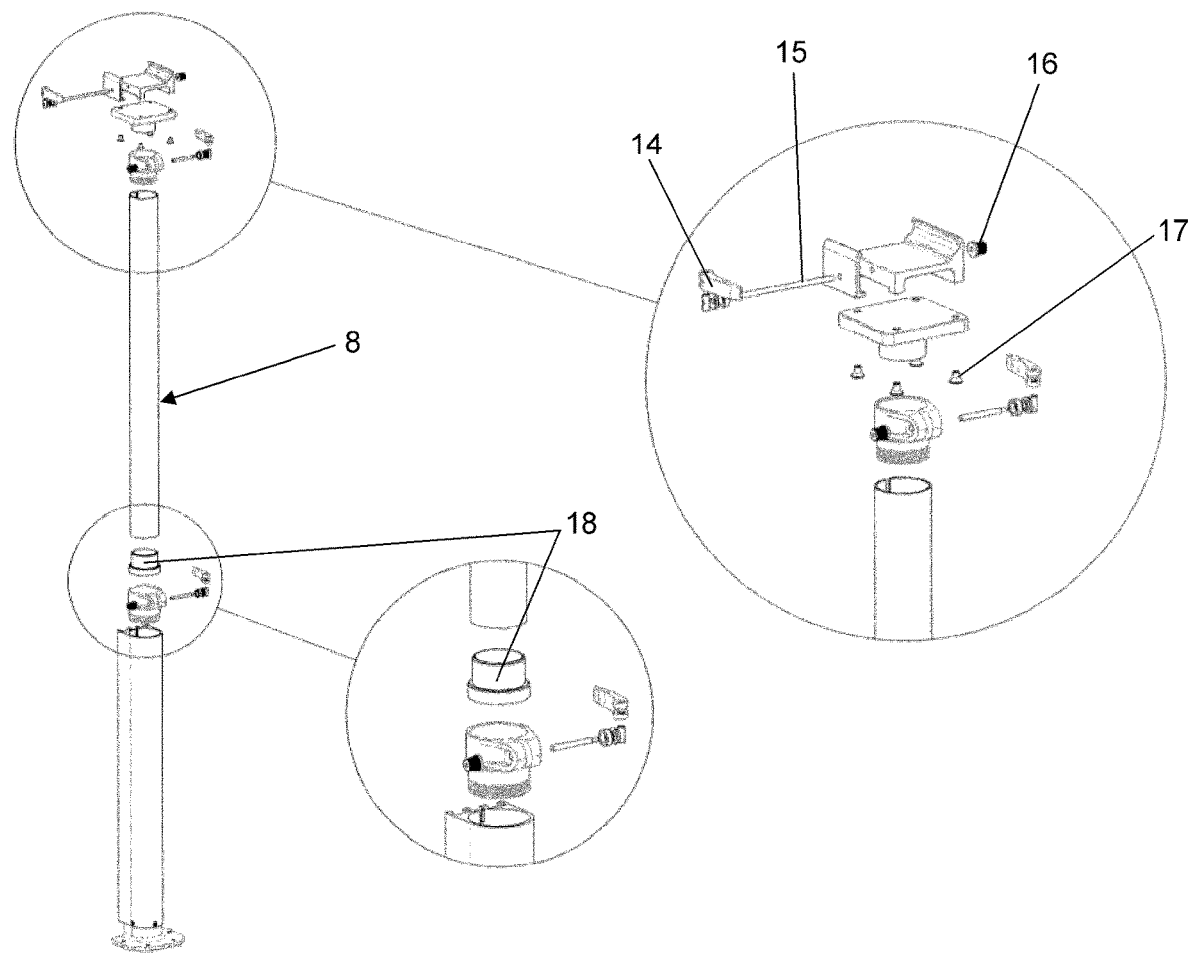
FIG. 10 shows a close-up view of the quick-release mechanism used throughout the mounting system and for attaching the mounting system to the telescopic stand.

FIG. 10 shows a close-up view of the quick-release mechanism for releasably attaching the mounting system 9 to the telescopic stand 8. Such quick-release mechanisms have a clamp lever 14, skewer 15, knob 16, screw 17, and bushing quick release clamp 18.

Figure 11:
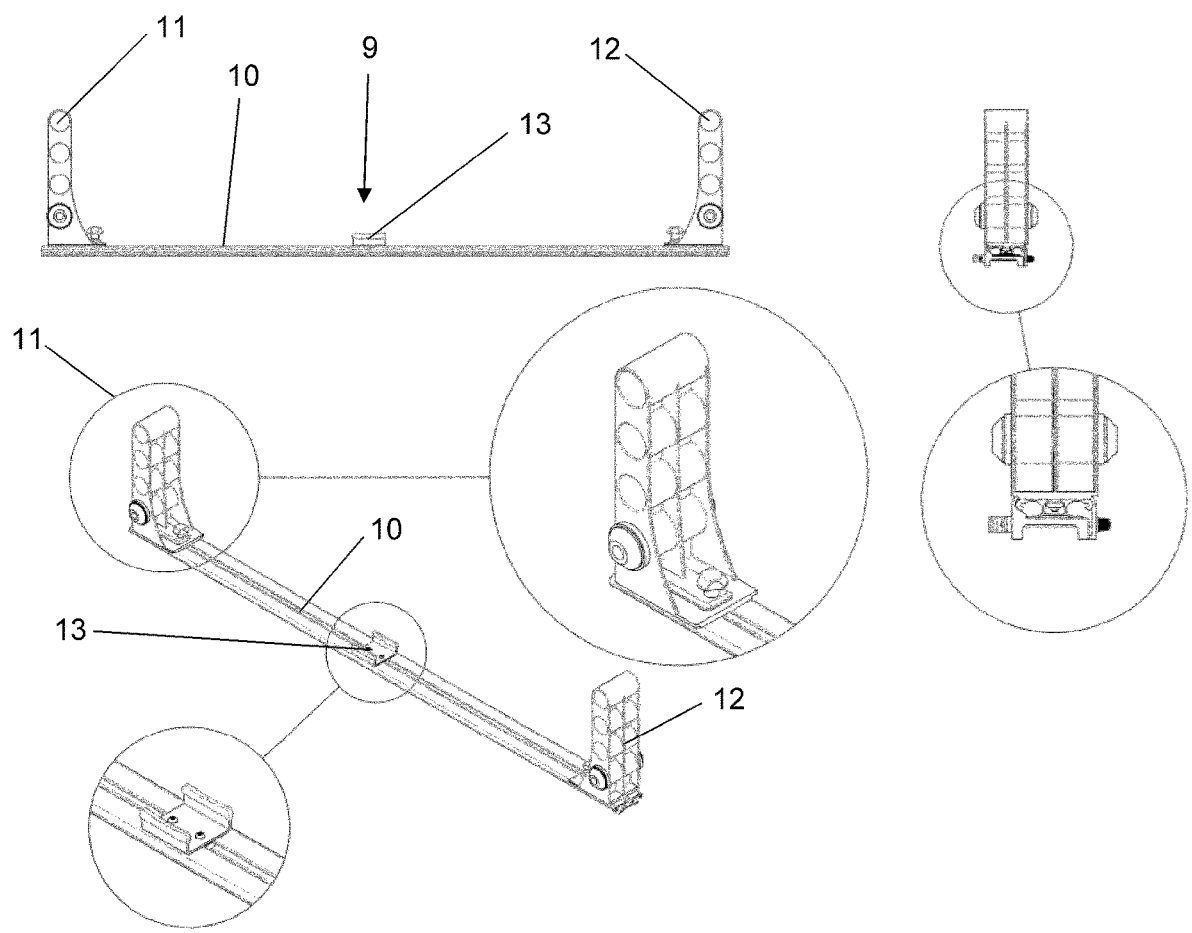
FIG. 11 shows a close-up view of the extrusion design of the mounting system allowing for a great range of adjustability.

FIG. 11 shows a close-up view of the mounting system 9 allowing for a great range of adjustability. The mounting system 9 has a rail 10, a first movable axial mount bracket 11, a second movable axial mount bracket 12, and a movable frame support bracket 13.

In the 'workshop mode' configuration, the second movable axial mount bracket 12 may be removed from the mounting system 9 and the movable frame support bracket 13 is repositioned (away from mount bracket 11) to allow the back wheel of the bike 2 to be mounted onto the rail 10 of the mounting system 9 as shown in FIGS. 3 and 4. This allows for mounting of the bike for maintenance without a requirement to remove the rear wheel of the bike.

Figure 12:
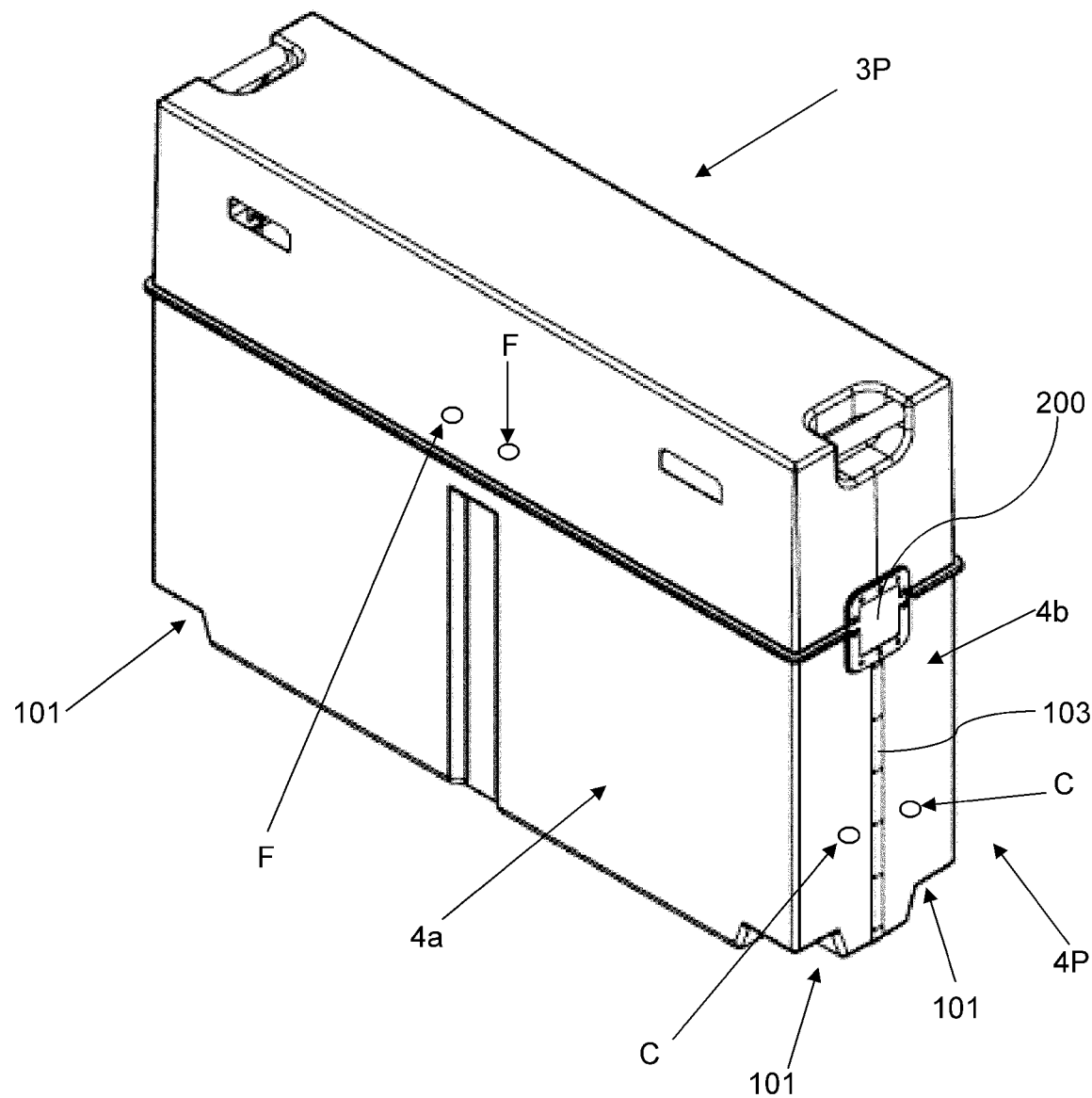
FIG. 12 shows a perspective view of a preferred embodiment for a protective case in a transport configuration.
Figure 13:
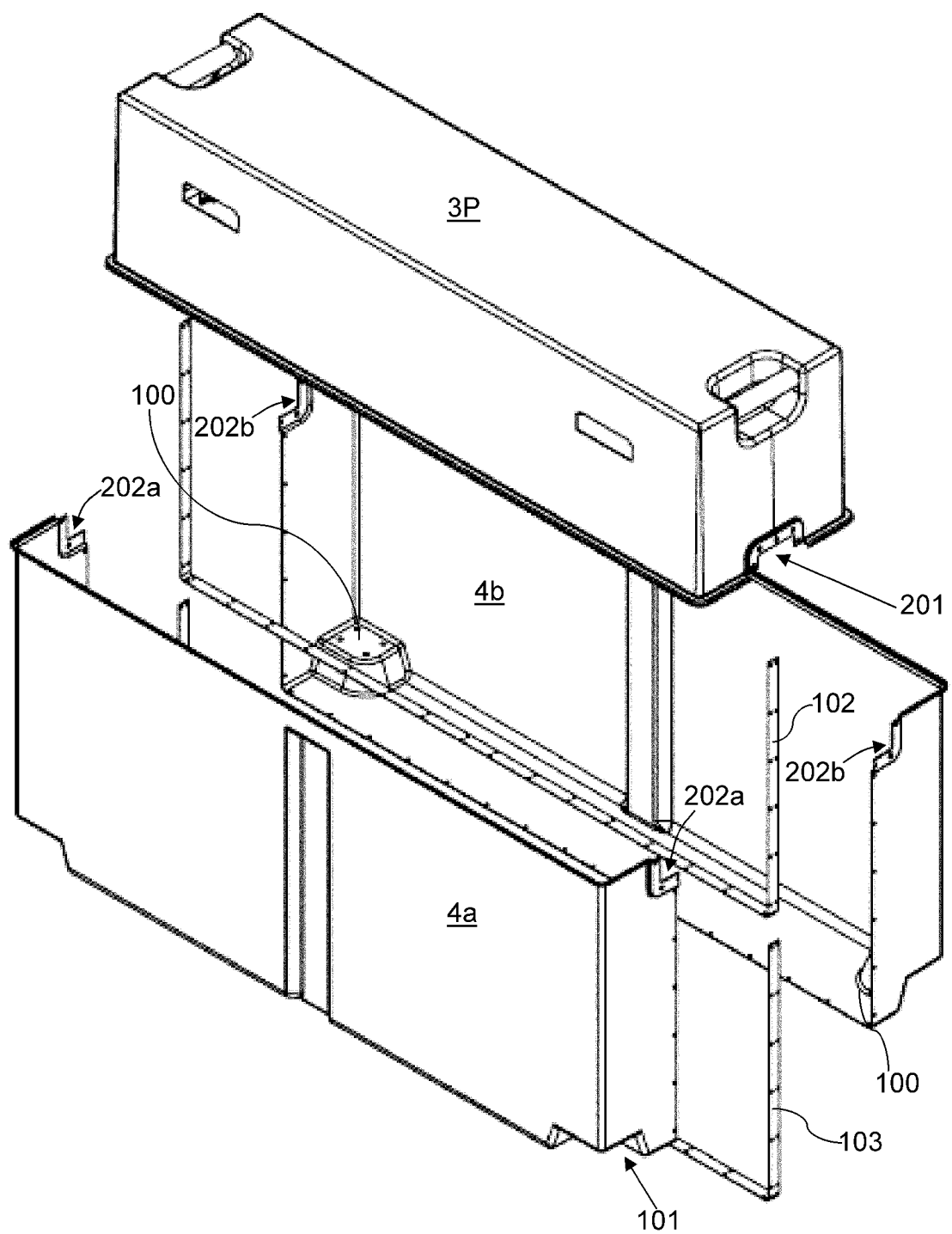
FIG. 13 shows a exploded perspective view of the protective case in FIG. 12.
Figure 14:
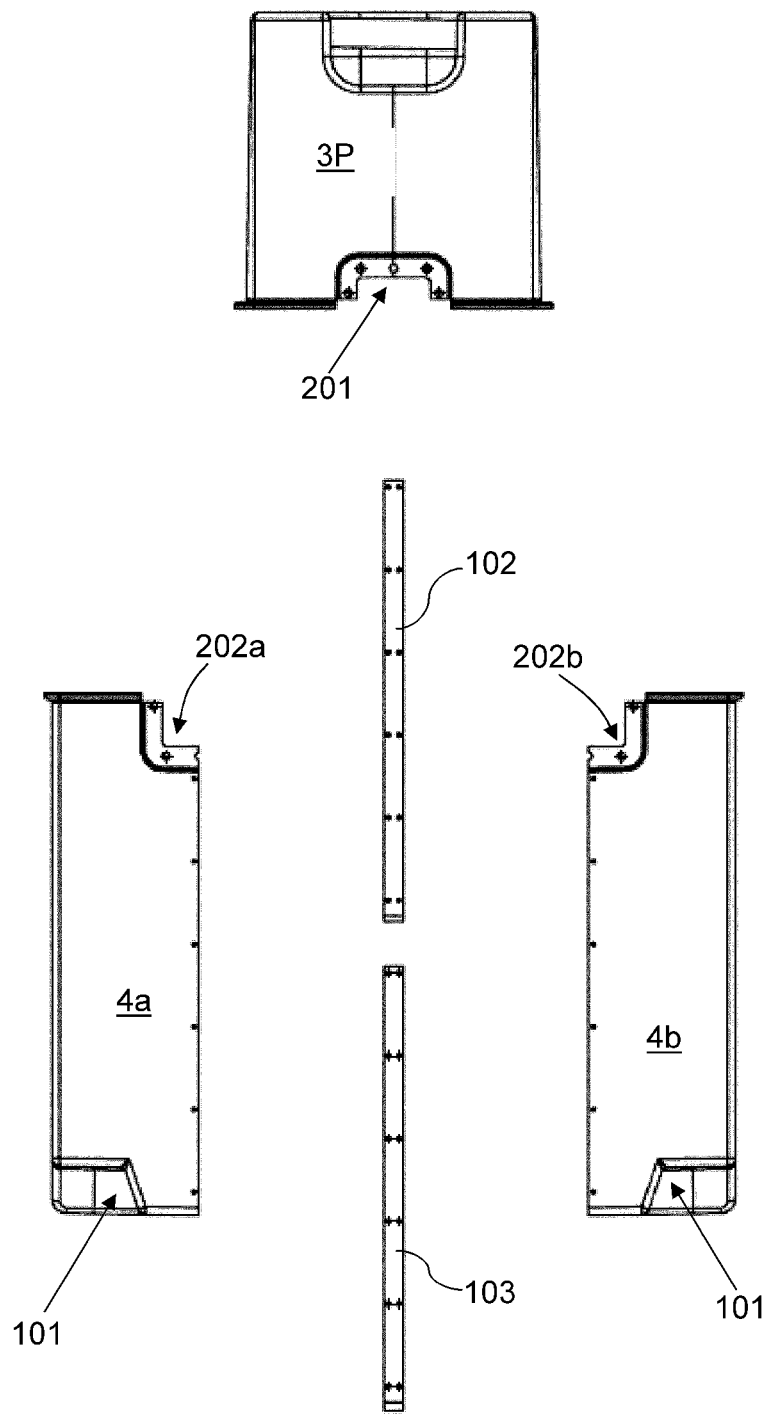
FIG. 14 shows an end on view of the perspective view shown in FIG. 13.

Example Two—See FIGS. 12-14

The top and lower half case parts 3*p*,4*p* in this embodiment are made from plastic moulded parts. In this example the top half case part 3*p* can be manufactured as a single piece via rotational moulding and the lower half 4*p* can be manufactured, again by rotational moulding, as two identical halves 4*a*,4*b* which are joined together.

The two identical lower case part halves 4*a*, 4*b* are joined via inner and outer metal joining strips 102, 103 which have apertures therein which match up with apertures in the halves 4*a*, 4*b*. The two halves 4*a*, 4*b* are joined via rivets not shown which pass through the apertures.

The lower identical halves 4*a*, 4*b* also have castor wheel recesses 101 in each corner and which also form connection points 100 having four apertures therein for connecting the castors to the lower half case part 4*a*, 4*b* via rivets (not shown).

The lower identical halves 4*a*, 4*b* and top case part 3*p* have a cutaway portions 201, 202*a*, 202*b* which form a recess 200 for receiving in use a catch assembly to connect the top case part 3*p* to the lower case part 4*p*.

A T-shaped work shop arrangement as shown In FIG. 2 may be achieved using a catch plate and a quarter turn fastener respectively located on the top and lower case parts as schematically shown by arrow F for the fastener and arrow C for the catch-refer to FIG. 12.

Preferably, the fastener may be DZUS Quarter Turn Fastener.

This alternate embodiment of the present invention makes a cost effective and aesthetically pleasing modern looking protective case. This case otherwise is substantially configured to operate in the work shop and transport configurations substantially as described above in relation to Example One.

Alternate Ways to Implement the Present Invention

The stand may come in a variety of different forms without departing from the scope of the present invention.

In one preferred embodiment the stand may be telescopic.

In some embodiments the stand may have one or more tubes and/or sleeves for releasably connecting to the mounting system.

The mounting system may come in a variety of different forms without departing from the scope of the present invention.

In one preferred embodiment the mounting system may be freely rotatable about a vertical axis to hold a bicycle at any angle to the longitudinal axis of the lower half case.

In another preferred embodiment the mounting system may be attachable to the stand via various quick-release mechanisms.

In some embodiments the mounting system may be attachable to the stand via one or more tubes and/or sleeves which releasably connect to one another by sliding one tube and/or sleeve into one another.

In some further embodiments the shape and size of the mounting system rail may vary.

In some further embodiments the mounting system may comprise an extrusion design allowing for a great range of adjustability.

The walls of the top and lower halves of the protective case may be made from a number of different materials and methods without departing from the scope of the present invention.

In preferred embodiments the rigid outer walls may be made from aluminum plastic or composite sheets.

In some preferred embodiments the sheets may be attached to a frame.

In some embodiments the frame members on one side of the top and bottom halves may be magnetic and capable of being used to connect the two halves in a side by side configuration.

In other embodiments the rigid outer walls may be made from hardboard or customboard sheets.

In some further preferred embodiments the walls for each tope and lower half may be formed from a mould.

In some such embodiments the lower half may be formed to have at least one socket on an internal side of one longitudinal side wall. The socket, in use, receiving the base of a stand.

In some other such embodiments the top and lower half may have one or more at least partially curved walls.

It is envisaged that the top half and lower half of the protective case may be made from different materials or constructions such that the top half is more light weight than the lower half. By this means the lower half can act as a stable base when the telescopic stand is in an extended position. In addition, this enables a lower center of gravity to be maintained when the protective case has a hinged top half connecting to the lower half.

In some embodiments the lower half may have retractable legs to provide stability.

In some embodiments the lower half may also have recessed wheels and/or one or more handles. The wheels and/or handles helping to assist with transportation of the case: to or from a vehicle, or whilst in transit in airport terminals prior to checking luggage or after collecting luggage.

In some embodiments the lower half may be made from more dense materials than the top half or may have additional materials, or weights, added thereto, to provide a stable base when the telescopic support stand is in its extended position supporting a bike to be worked on.

Preferably, the frame of the protective case may be made from light weight elongate frame members, such as, but not limited to:
aluminum extrusions;
plastic extrusions;
carbon fibre rectangular or circular tubes.

In some embodiments the protective case of the present invention may include one or more of the following features:
a mount for affixing to a vehicle;
an indicator and tail light system for vehicles when the protective case is mounted to a tow bar or tow hitch;
LED lights (or other low energy high output lights) around and/or proximate the top rim of the lower half of the protective case to illuminate the stand when working in low light environments;
internal supports for holding gear bags.

The two halves of the protective case may releasably connect together on top of one another in a number of ways without departing from the scope of the present invention.

In one preferred embodiment the two halves of the protective case may use a plurality of toggle latches to connect together.

In another preferred embodiment the two halves of the protective case may use a plurality of quick release push clips. The quick release push clips may in some embodiments have male and female halves.

In one embodiment two halves may connect to one another using quick release buckles integrally formed into the top and bottom halves.

In some embodiments the two halves of the protective case may use rotating latches on one half of the case which have slots therein which locate on bosses located on the other half of the case.

The mounting system may be adapted to connect to a bicycle frame in a variety of ways.

In one preferred embodiment the mounting system may include a channel into which the bicycle or bicycle frame can be placed.

The shape of the channel may vary.

In one embodiment the shape of the channel may be substantially v-shaped.

In another embodiment the shape of the channel may be substantially u-shaped.

In still other embodiments the shape of the channel may be semi-circular in shape.

The channel may also include a clamp or other mechanism to retain the frame in the channel.

In another embodiment the stand may include at least two support arms onto which the bicycle frame can be placed. The arms having a bungy cord arrangement for holding the frame onto the arms.

There are a number of ways the case may be adapted to connect together side by side to form a base of greater lateral dimensions than the enclosed hollow rectangular cuboid without departing from the scope of the present invention.

In one preferred embodiment the top and bottom halves may connect to one another side by side or in the above described 'T shape' via magnetic connectors.

In another preferred embodiment the top and lower halves may connect to one another so as to be side by side or in the described 'T shape' via open ended channels which are located on one of the top half and the lower half into which bulbous protrusions on the other one of the top half and lower half can sliding engage and be retained therein.

In another preferred embodiment the mounting system is freely rotational to move from the parallel position to the orthogonal position with respect to the lower case part.

In another preferred embodiment the mounting system is attached to the telescopic stand via a plurality of tube fitting sleeves with lugs to prevent unwanted rotation and to secure either the parallel position or the orthogonal position with respect to the lower case part.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

What we claim is:

1. A protective case for a bicycle, comprising: a top case part and a lower case part, each case part having one or more wall sections substantially defining an interior area on an inner surface of one or more wall(s); wherein when said top case part is releasably connected to a top of the lower case part the case parts form an at least substantially enclosed space; and wherein the lower case part of the protective case includes a stand attached thereto, said stand extendable from a non-extended position to an extended position without being detached from the lower case part;

with the top case part releasably connected to the top of the lower case part and with the stand attached to the lower case part in the non-extended position, the case is configured for storage and transportation of the bicycle with wheels of the bicycle removed from the bicycle frame;

with the top case part removed from the top of the lower case part and with the stand attached to the lower case part in the extended position the stand extends from the lower case part to support the at least partially assembled bicycle fully outside of the lower case part, the case is configured as a freestanding mobile workshop for working on the at least partially assembled bicycle;

a mounting system attached to the stand for mounting the bicycle on the stand, said mounting system being configured to be movable between at least two positions:

a first position wherein the mounting system holds the bicycle in alignment or parallel to a longitudinal axis of the lower case part; and a second position wherein the mounting system holds the bicycle orthogonally with respect to the longitudinal axis of the lower case part;

wherein when the top case part is removed from the top of the lower case part, the top case part and lower case part are configured for the top case part to be connected to one end of the lower case part and orthogonal to the lower case part so that the top and lower case parts form a T-shape to provide stability when configured as the freestanding mobile workshop.

2. The protective case for a bicycle as claimed in claim 1, wherein the stand remains permanently attached to the lower case part.

3. The protective case for a bicycle as claimed in claim 1, wherein the mounting system is removably attached to the stand.

4. The protective case as claimed in claim 3, wherein with the case configured for storage and transportation of the bicycle and with the mounting system removed from the stand, the mounting system forms a mount for holding the bicycle securely in place within the protective case.

5. The protective case as claimed in claim 1, wherein the mounting system is rotatable about a vertical axis to move between the first and second positions.

6. The protective case as claimed in claim 1, wherein the mounting system is rotatable to hold the bicycle at any angle to the longitudinal axis of the lower half case.

7. The protective case as claimed in claim 1, wherein the lower case part and the mounting system are configured so that the bicycle remains mounted to the mounting system in both the storage and transportation configuration and the freestanding mobile workshop configuration.

8. A method of converting a protective case for a bicycle between a transport configuration and a work configuration, comprising the steps of:

a) connecting a top case part and a lower case part of a protective case on top of one another and with a telescopic stand attached to the lower case part in a retracted state: to effect the transport configuration for storage or transportation of the bicycle with wheels of the bicycle removed from a frame of the bicycle;

b) disconnecting the top case part and lower case part of the protective case; and c) connecting the top case part and lower case part of the protective case to one another and with a mounting system attached to the telescopic stand, wherein the telescopic stand is moveable to a fully extended state to effect the work configuration and support the at least partially assembled bicycle outside of the lower case part, wherein the mounting system is movable to hold the bicycle in alignment or parallel to the longitudinal axis of the lower case and orthogonal to the longitudinal axis of the lower case part when supporting the partially assembled bicycle outside of the lower case part, and wherein when the top case part is removed from the top of the lower case part, the top case part and lower case part are configured for the top case part to be connected to one end of the lower case part and orthogonal to the lower case part so that the top and lower case parts form a T-shape to provide stability when configured as the freestanding mobile workshop.

9. A protective case for a bicycle, comprising: a top case part and a lower case part, each case part having one or more wall sections substantially defining an interior area on an inner surface of one or more wall(s); wherein when said top case part is releasably connected to a top of the lower case part they form an at least substantially enclosed space; and wherein the lower case part of the protective case includes a stand attached thereto, said stand extendable from a non-extended position to an extended position without being detached from the lower case part;

with the top case part releasably connected to the top of the lower case part and with the stand attached to the lower case part in the non-extended position, the case is configured for storage and transportation of the bicycle with wheels of the bicycle removed from the bicycle frame;

with the top case part removed from the top of the lower case part and with the stand attached to the lower case part in the extended position the stand extends from the lower case part to support the at least partially assembled bicycle fully outside of the lower case part, the case is configured as a freestanding mobile workshop for working on the at least partially assembled bicycle; and a mounting system releasably attachable to the stand for mounting the bicycle on the stand in the freestanding mobile workshop configuration, and wherein when the top case part is removed from the top of the lower case part, the top case part and lower case part are configured for the top case part to be connected to one end of the lower case part and orthogonal to the lower case part so that the top and lower case parts form a T-shape to provide stability when configured as the freestanding mobile workshop.

10. The protective case for a bicycle as claimed in claim 9, wherein the lower case part and the mounting system are configured so that the bicycle remains mounted to the mounting system in both the storage and transportation configuration and the freestanding mobile workshop configuration.

11. The protective case as claimed in claim 10, wherein with the case configured for storage and transportation of the bicycle and with the mounting system removed from the stand, the mounting system forms a mount for holding the bicycle securely in place within the protective case.

12. The protective case as claimed in claim 9, wherein the mounting system is rotatable to hold the bicycle at any angle to the longitudinal axis of the lower half case.

13. A kit of parts for a protective case for a bicycle, comprising:
    an upper case part; and
    at least one lower case part;
    wherein the lower case part is adapted to hold and support, in use, a telescopic stand in place once the case is assembled, to enable the telescopic stand to be implemented in both a transport or workshop configuration of the case, and wherein when the upper case part is removed from a top of the lower case part, the upper case part and lower case part are configured for the upper case part to be connected to one end of the lower case part and orthogonal to the lower case part so that the upper and lower case parts form a T-shape to provide stability when configured as the freestanding mobile workshop.

14. The kit of parts as claimed in claim 13 wherein the kit includes:
    a telescopic stand for parts therefor which form in use a support post.

15. The kit of parts as claimed in claim 13 wherein the kit includes:
    a mount assembly which is adapted to connect to a bicycle wherein the mount assembly connects to a support post in a manner which allows a 360 degree position of the mount relative to the support post to be fully adjusted.

16. A protective case for a bicycle, comprising: a top case part and a lower case part, each case part having one or more wall sections substantially defining an interior area on an inner surface of one or more wall(s); wherein when said top case part is releasably connected to a top of the lower case part the case parts form an at least substantially enclosed space; and wherein the lower case part of the protective case includes a stand attached thereto, said stand extendable from a non-extended position to an extended position without being detached from the lower case part;
    with the top case part releasably connected to the top of the lower case part and with the stand attached to the lower case part in the non-extended position, the case is configured for storage and transportation of the bicycle with wheels of the bicycle removed from the bicycle frame;
    with the top case part removed from the top of the lower case part and with the stand attached to the lower case part in the extended position the stand extends from the lower case part to support the at least partially assembled bicycle fully outside of the lower case part, the case is configured as a freestanding mobile workshop for working on the at least partially assembled bicycle; and
    wherein when the top case part is removed from the top of the lower case part, the top case part and lower case part are configured for the top case part to be connected to one end of the lower case part and orthogonal to the lower case part so that the top and lower case parts form a T-shape to provide stability when configured as the freestanding mobile workshop.

\* \* \* \* \*